C. THURSTON AND W. D. MILLER.
REVOLVING HARROW.
APPLICATION FILED FEB. 24, 1919.
1,330,150.
Patented Feb. 10, 1920.
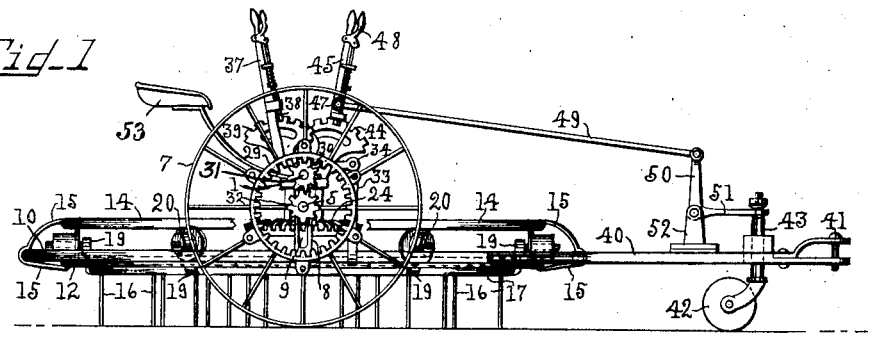
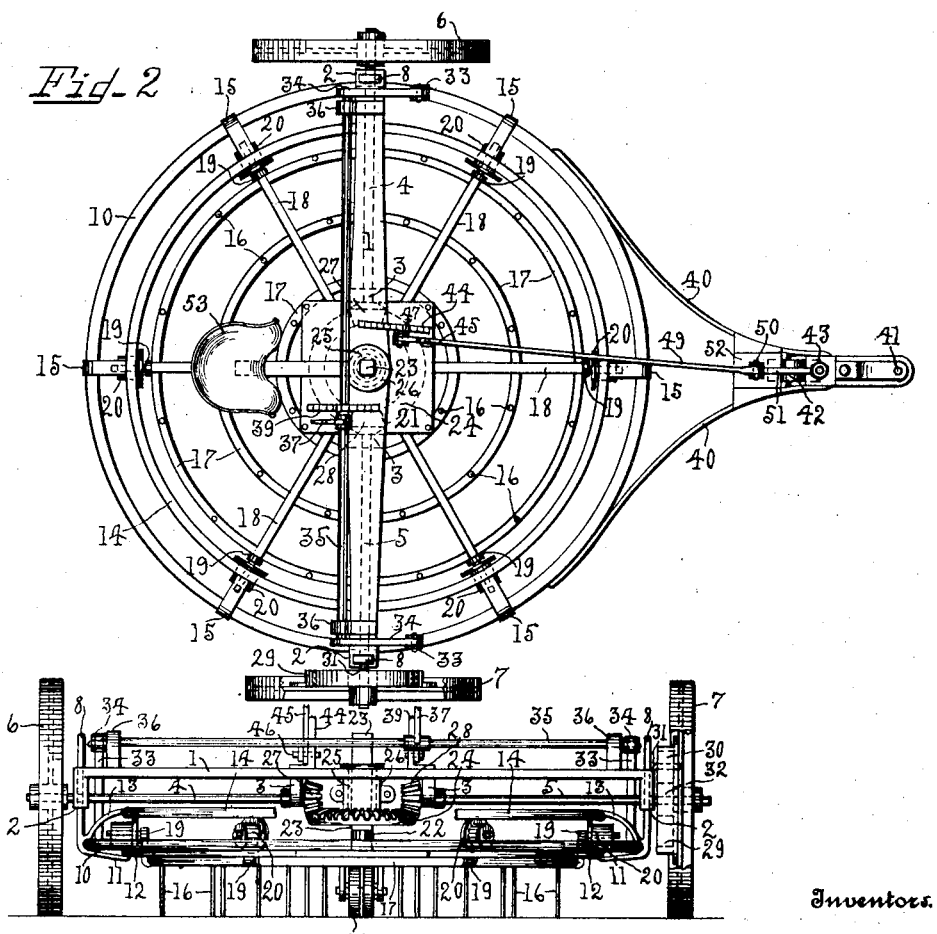
Inventors.
Collie Thurston.
Willie D. Miller.
By J. P. Dederick.
Attorney.

UNITED STATES PATENT OFFICE.

COLLIE THURSTON AND WILLIE D. MILLER, OF SHERMAN, TEXAS.

REVOLVING HARROW.

1,330,150.  Specification of Letters Patent.  Patented Feb. 10, 1920.

Application filed February 24, 1919. Serial No. 278,708.

*To all whom it may concern:*

Be it known that we, COLLIE THURSTON and WILLIE D. MILLER, citizens of the United States, residing at Sherman, in the county of Grayson and State of Texas, have invented certain new and useful Improvements in Revolving Harrows, of which the following is a specification.

This invention relates to wheeled revolving harrows; and the object in view is to provide a simple and compact implement by which the ground may be thoroughly pulverized to reduce it to a good condition for planting grain.

In our implement a wheeled frame is provided for the accommodation of the driver's seat and the several operative elements of the structure. One element is a circular frame formed by a series of pipes and hung on the wheeled frame, and carrying a series of revoluble circles of varying diameters having teeth adapted to exert a pulverizing effect on the soil, the circular frame and the revolving circles being adjustable collectively by suitable lever, and adapted to be raised simultaneously with relation to the wheeled frame for the purpose of moving the operating elements above the ground-line and enabling the machine to be transported to or from the field without permitting the teeth to touch the ground.

With these ends in view the invention consists in the novel combination of elements and the construction and arrangement of parts, which will be hereinafter fully described and claimed.

To enable others to understand the invention, we have illustrated the preferred embodiment thereof in the accompanying drawings, forming a part of this specification, and in which—Figure 1 is a side elevation of a harrow constructed in accordance with our invention and showing the teeth carrying frames in operative relation to the ground. Fig. 2 is a plan view, and Fig. 3 is a rear view of Fig. 1.

The same numerals of reference are used to indicate like and corresponding parts in each of the several figures of the drawings.

The wheeled frame of our improved harrow consists of the transverse bar or housing 1, having downwardly extended brackets 2 and 3 in which are journaled the axles 4 and 5 respectively. Carrying wheels 6 and 7 are mounted on the axles, wheel 6 being secured to axle 4 and wheel 7 loosely fitted to axle 5. The outer faces of the brackets 2 are provided with guides in which vertically movable slides 8 are fitted, the slides having vertical slots to straddle the axles as shown at 9 Fig. 1, and their lower ends are secured to the horizontally disposed circular pipe frame member 10. Branches 11 extend inwardly from these connected ends and are secured to a circular pipe section 12, and similar branches 13 support the circular section 14. Circles 12 and 14 are similar in size, of less diameter than member 10, and additionally connected and supported, one above the other, by brackets 15.

The harrow teeth 16 are carried by three concentric and horizontally disposed pipe circles 17, spaced equal distances apart and firmly connected by radial bars 18 secured thereto. At the extended end of each bar are radially journaled flanged rollers 20 adapted to roll upon the circular pipe or track 12, while the circle 14 acts as a guard to prevent their displacement from the track, and the circles as an entirety are free to be adjusted in a vertical direction on the transverse bar 1. A plate 21 is secured to the radial bars 18, and centrally to the inner circle 17. An upstanding pin having a short round portion 22, and an extended square portion 23, passes loosely through a square aperture centrally located in the bevel gear 24, and through a round aperture in a sleeve 25 integral with the gear. The sleeve is supported in a bearing 26 centrally located on the bar 1, the round hole through it permitting the square corners of the pin to turn therein. The bevel pinion 27 on the axle 4, engages the bevel gear at one side thereof, and a similar pinion 28 secured to the axle 5, is in engagement with the opposite side of the gear. An internal spur gear 29 is centrally attached to the spokes of ground wheel 7, a spur pinion 30, having a journal 31 secured to the bar 1 engages the spur wheel, and a spur pinion 32 secured to the axle 5, and in engagement with the pinion 30, enables the bevel pinions to act in unison for revolving the harrow portion of the device. While the square portion 23 of the pin remains in the square aperture of the bevel gear, and the device is propelled, the harrow portion will continue to revolve, but when the harrow portion is raised until the round part 22 is in the gear aperture the machine may be moved without revolving the harrow.

The harrow is designed to be raised out of operative position in transporting the machine from one place to another, and to lower the circles into working position we provide an adjusting appliance which is supported by the wheeled frame, and connected to opposite sides of the frame member 10 by side bars 33. The upper ends of the side bars are pivoted on arms 34, of a rock-shaft 35. This shaft is arranged across the wheeled frame member 1, and is mounted in bearings 36 secured to said member, and to the rock-shaft is firmly secured an adjusting lever 37. This lever is equipped with a latch 38, adapted to engage with a notched arc 39 which is fastened to the bar 1 of the wheeled frame, and thus the rock-shaft may be held by the lever and latch connections, at any point of its adjustment with reference to the harrow frame, thus regulating the position of the teeth and all parts associated therewith with reference to the ground line, and determining the penetration of said teeth. Draft-bars 40 are secured to the frame member 10 at the front of the machine and provide for a doubletree which may be pivoted thereto in the usual manner by bolt 41, and this doubletree may support swingletrees to which a team of draft animals may be hitched, but with machines of large size, traction engine propulsion would be preferable.

The front end of the machine is designed to be adjustable to or out of operative position, conforming to the adjustment of the rear portion, so the front end is mounted upon a caster wheel 42, pivotally connected to the draft bars 40 by vertical stem 43. A notched segment 44 is secured to the frame 1, an adjusting lever 45 is fulcrumed, as at 46, on the segment in a position concentric with the arc of the same and said lever 45 carries a latch 47, which is controlled by a grip lever 48, that is mounted on said lever 45, the latch being disposed on the lever to engage with the notched segment. To the operating lever 45 is connected a rod 49 that extends to and is connected with the upstanding end 50 of a bell-crank, the horizontally extending end 51 of the crank being swivelly connected with the upper end of the caster support 43, and the crank is pivotally connected to a stand 52 secured to the draft bars 40.

The implement is equipped with a seat 53 which is mounted on a standard secured to the transverse bar 1 of the wheeled frame, and this seat is disposed in a position which will enable the operator or driver to easily grasp either of the series of levers 37 and 45.

Having thus set forth the object and nature of our invention, and a form of apparatus embodying the same and having described the construction, function, and mode of operation thereof, what we claim as new and desire to secure by Letters Patent, is—

1. In a revolving harrow, the combination with a wheeled frame, of a circular frame hung thereon, a series of circles of varying diameters revolubly mounted on said frame, harrow teeth carried by the revoluble circles, a lever mounted on the wheeled frame and connected with said circular frame for adjusting the latter with reference to said wheeled frame.

2. In a revolving harrow, the combination with a wheeled frame, of a frame comprising inner and outer circular pipe sections, forwardly extending draft bars united firmly to one of the sections and carried at their extended ends on a caster wheel, the pipe portions hung on the wheeled frame, means for adjusting both parts of the pipe section frame with relation to the wheeled frame, tooth carrying members consisting of a series of circles, radially disposed bars uniting and maintaining the circles in spaced relation, and radially disposed rollers at the ends of the radial bars adapted to travel on the lower inner circle of the frame.

In testimony whereof we affix our signatures.

COLLIE THURSTON.
WILLIE D. MILLER.